Jan. 1, 1952　　　　　H. C. ECKELS　　　　　2,580,743
FOLDING BASE FOR AUTOMOBILE JACKS
Filed April 29, 1948
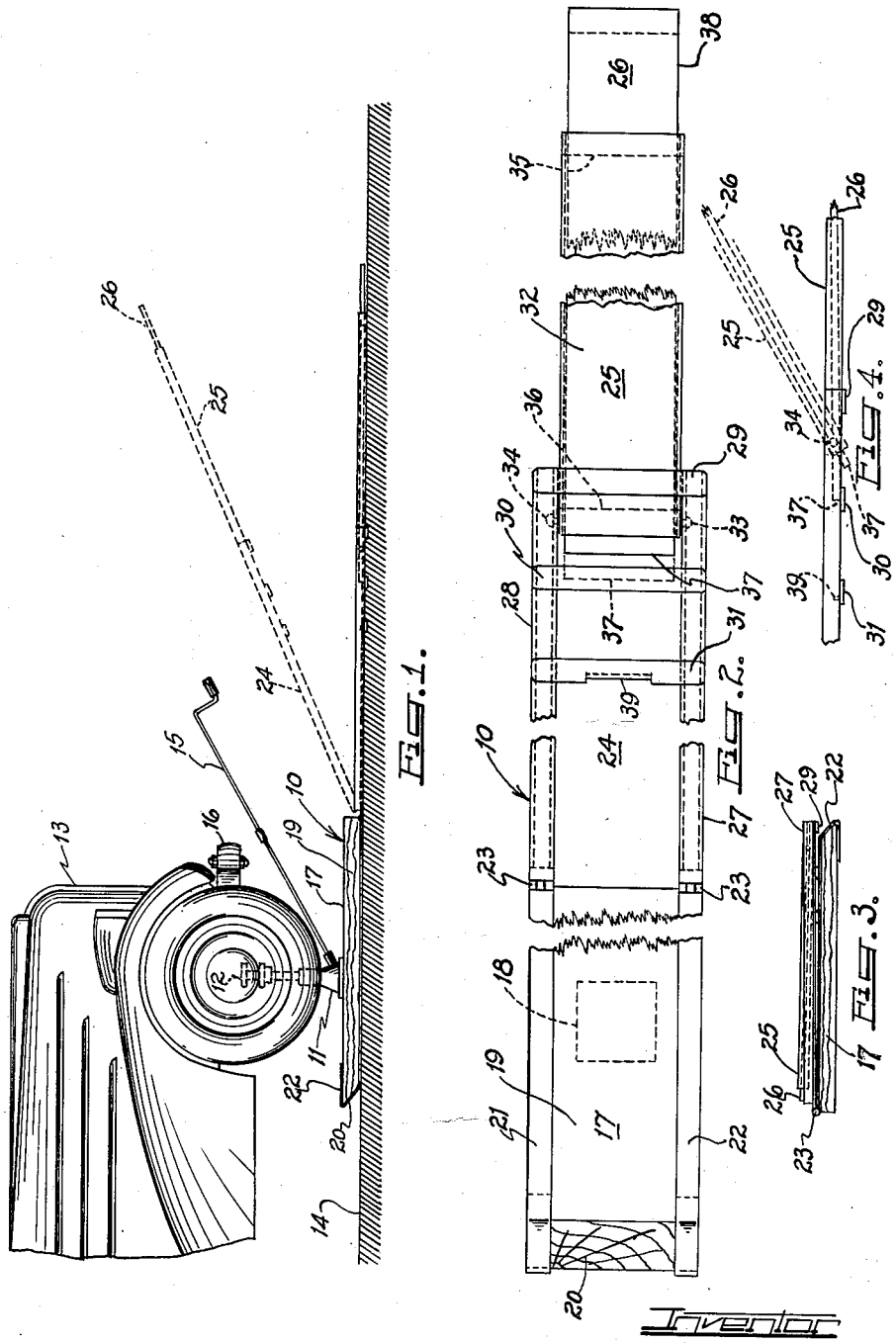
Inventor
HORACE C. ECKELS
By Charles A. Redman Atty.

Patented Jan. 1, 1952

2,580,743

UNITED STATES PATENT OFFICE 2,580,743

FOLDING BASE FOR AUTOMOBILE JACKS

Horace C. Eckels, La Grange, Ill.

Application April 29, 1948, Serial No. 24,082

6 Claims. (Cl. 248—346)

My invention relates generally to jack positioning devices, and more particularly to devices for facilitating the positioning of a jack beneath the chassis of a vehicle.

Much difficulty is usually involved in locating a jack beneath a vehicle. This is particularly true of present day automobiles which have low centers of gravity and skirted fenders rendering the areas beneath the car very inaccessible. These factors are aggravated when tire trouble is experienced at night and when the car is parked over soft or irregular ground at the jack position. Quite often the only way to insure the proper positioning of a jack is for the motorist to crawl under the car. This usually is not feasible because the motorist is seldom dressed in suitable clothes.

It is one of the important objects, then, of this invention to overcome the above mentioned and other disadvantages resulting from the use of automobile jacks, and to this end I provide a support by which a jack is more easily moved to a functioning position beneath a car.

Another object of this invention is the provision of a base or support having a greater area of contact with the surface of the ground than the base of the jack, thereby permitting the use of the device and providing a more positive support for a jack on soft or rough ground.

A still further object of the invention is to provide a jack positioning device which is easily manipulated by an operator when in a standing position.

Still another object of this invention is to provide for an automobile jack a collapsible or foldable support which is compact, light weight, and readily lends itself to be manufactured inexpensively.

The foregoing and numerous other objects and advantages will be more apparent from the following detailed description when considered in connection with the accompanying drawing, in which:

Figure 1 is a fragmentary side elevational view of the front end of an automobile in operative association with a jack and a jack supporting base of the type contemplated by this invention, with the handle section shown in a manipulating position in dotted lines;

Figure 2 is an enlarged fragmentary plan view of the bottom of the jack supporting base as seen when in an unfolded position;

Figure 3 is a side view in elevation showing the device in a folded position; and, Figure 4 is a fragmentary side elevational view illustrating details of the locking means on the hinged handle sections.

As shown on the drawing:

Like reference numerals have been employed to indicate the same or similar parts in the several figures.

The jack positioning device or supporting base is generally indicated by the reference numeral 10. As illustrated in Figure 1, the device of this invention supports a lifting jack 11 which is positioned beneath the axle 12 of a car 13 to raise the latter off the ground 14. The jack is operated by the handle 15 which extends beyond the bumper 16 and thus is easily accessible.

My invention includes a base or footing section 17 adapted to lie on the ground and serve as an enlarged support on which a jack may be positioned or mounted as at 18. The base comprises an oblong member 19, preferably a wood board although it may be of any suitable material combining light weight and strength. One end 20 is beveled to facilitate forward movement of the base section 17 when it is pushed along the ground beneath a car to position a jack. The bevel results in the board riding over rough ground or objects thereon. Metal straps 21 and 22 are fastened along each edge of the base board and run the length thereof on the bottom or ground engaging side. Each strap terminates at one end on the top surface of the base adjacent its beveled end and at the other end in either the male or the female part of a hinge 23. The straps act as smooth runners which facilitate sliding the board along the ground and protect the board against rapid wear.

The board is maneuvered to a desired position by a handle made up of the sections 24, 25 and 26. The handle section 24 comprises a pair of channel members 27 and 28 each of which terminates in a hinge part complementary to that part on the adjacent strap 21 or 22. At the ends of the channel members opposite the hinges 23, there is secured a lateral strap 29. Spaced therefrom are two additional straps 30 and 31.

The handle section 25 consists of a channel shaped member 32 having one end positioned between the ends of the channels 27 and 28 and pivoted thereto as at 33 and 34. At both ends of the channel member 32 there are provided straps, such as 35 and 36, which bridge and close the open side to form rectangular end sections.

Slidably contained within the channel member 32 for endwise movement only, is the third section of the handle or the member 26.

By referring to Figures 2 and 4, it will be apparent that the position to which the member 26 is moved will determine whether the sections 24 and 25 are locked together or are free for relative rotation. When the member 26 is in the position shown in full lines in Figure 2, its inner end 37 lies between the straps 29 and 30 thereby permitting the section 25 to swing around the pivots as shown in dotted lines in Figure 4. However, when the member 26 is moved toward the section 24 until the end 37 is over the strap 30 the two handle sections 24 and 25 are locked together.

As seen in Figure 4, the strap 29 coacts with the pivots 33 and 34 to prevent rotation of the handle section 25 in a clockwise direction. Similarly, the strap 30 coacts with the pivots 33 and 34 to prevent rotation of the handle section 25 in a counter-clockwise direction. As a result, the sections 24 and 25 are locked together.

The outer end 38 of the handle section 26 normally extends beyond the outer end of the section 25 to provide a hand grip portion. It is necessary to limit the endwise movement of the handle section 26 towards the base section 17, particularly when the handle is in an upwardly inclined position as shown in Figure 1 in which position an operator is able to manipulate the device while standing. This limiting of the endwise movement is accomplished by a stop member 39 which is a bumper portion struck up from a side edge of the strap 31.

When the jack support or base of this invention is to be used, the swingable sections are unfolded to the positions shown in Figure 2 and the endwise movable section moved to a locking position. A jack is positioned or fastened on the base section and the latter is moved by the handle along the ground under the automobile until the jack is properly positioned beneath the axle or other assembly to be raised. The handle, being long and hinged to the base section, avoids the troublesome stooping and reaching to locate a jack to a desired position beneath a car.

When the use of the jack is finished, it is withdrawn and the base or support folded into a compact unit for storage in the tool box or trunk of the automobile, as shown in Figure 3.

While only one embodiment of the present invention has been shown herein, it will of course be understood that the invention is not to be limited thereto since many modifications may be made.

I claim as my invention:

1. A jack positioning device comprising an oblong footing member adapted to support a jack and be positioned beneath the structure of a vehicle, straps extending along the bottom of said footing member adjacent the side edges thereof, each of said straps terminating at one end of the footing member in either the male or female of a hinge, channel members in alignment with said straps, each of said channel members terminating at one end in a hinge portion complementary to the hinge portion on an end of the adjacent strap, spaced straps extending laterally across said channels at their ends opposite the hinge portions, another channel member having an end pivoted to and between the ends of said previously mentioned channel members on which said straps extend, and a handle member slidably mounted on said another channel member, said handle member and said spaced straps selectively coacting to lock said pivoted channel members against relative movement.

2. A jack positioning device comprising an oblong footing member having a beveled end and adapted to support a jack and be positioned beneath the structure of a vehicle, metal strips extending at the side of said footing member along the bottom and around the beveled end and partially along the top thereof, each of said strips terminating at the end of the footing member opposite the beveled end in either the male or female portion of a hinge, a pair of channel members each terminating in one end in a hinge portion complementary to the hinge portion on the adjacent strip, said hinge portions pivotally connecting said channel members to and in alignment with said strips, a first strap extending laterally across said channels at their ends opposite the hinged ends, a second strap extending laterally across said channels in spaced relation to the first said strap, a third strap spaced from said second strap and having an upturned portion defining a stop means, another channel member having straps extending across the legs thereof at both ends, one end of said another channel member being positioned between and pivoted for relative movement to the ends of said pair of channel members on which said first and second straps extend, and a handle member slidably carried within said another channel member and movable toward and away from said stop means, said handle member being movable to positions coacting with said first and second straps to lock said pivoted channel members against relative movement.

3. A jack positioning device comprising a footing member adapted to support a jack, and a handle for said footing member for maneuvering it, said handle having a plurality of sections, pivot means connecting said sections for relative swinging movement, an additional handle section telescopically carried by one of said sections to selectively extend into the other of said sections, and means limiting said selective extension and coacting with said additional section to lock said pivot means thereby locking the sections against relative swinging movement.

4. A jack positioning device comprising a footing member arranged to support a jack, a handle for maneuvering said footing member and having a plurality of sections, a guideway in said sections, means pivotally connecting said sections for relative movement, and a member selectively shiftable along said guideway for locking the handle sections against relative movement.

5. A jack positioning device comprising a footing member arranged to support a jack, a handle for maneuvering said footing member and having a plurality of sections, means pivotally connecting said sections for relative movement, a channel guideway in each of said sections, and a member slidable in said guideways when they are in alignment to a position overlapping adjacent handle sections and the pivotal connection therebetween for locking the handle sections against relative movement.

6. A jack positioning device comprising a footing member arranged to support a jack, a handle for maneuvering said footing member and having a pair of sections, pivot means connecting said sections for relative movement, a guideway in said sections, an abutment stop on one of said sections, and a member slidable in said guideway into abutment wiht said stop whereby said member overlaps said handle sections and said pivot means for locking the sections together against relative movement.

HORACE C. ECKELS.

REFERENCES CITED

The following references are of record in the file of this patent:

UNITED STATES PATENTS

| Number | Name | Date |
|---|---|---|
| 1,887,924 | Evans | Nov. 15, 1932 |
| 1,903,341 | Mitchell | Apr. 4, 1933 |
| 1,994,060 | Ashkenas | Mar. 12, 1935 |
| 2,078,989 | Ashkenas | May 4, 1937 |